United States Patent
Bärecke

(10) Patent No.: US 11,186,285 B2
(45) Date of Patent: Nov. 30, 2021

(54) METHOD FOR ESTIMATING A FRICTION COEFFICIENT OF A ROADWAY BY A TRANSPORTATION VEHICLE, CONTROL DEVICE, AND TRANSPORTATION VEHICLE

(71) Applicant: VOLKSWAGEN AKTIENGESELLSCHAFT, Wolfsburg (DE)

(72) Inventor: Frank Bärecke, Wolfsburg (DE)

(73) Assignee: Volkswagen Aktiengesellschaft

(*) Notice: Subject to any disclaimer, the term of this patent is extended or adjusted under 35 U.S.C. 154(b) by 215 days.

(21) Appl. No.: 16/469,177

(22) PCT Filed: Nov. 29, 2017

(86) PCT No.: PCT/EP2017/080822
§ 371 (c)(1),
(2) Date: Jun. 13, 2019

(87) PCT Pub. No.: WO2018/108533
PCT Pub. Date: Jun. 21, 2018

(65) Prior Publication Data
US 2020/0094843 A1    Mar. 26, 2020

(30) Foreign Application Priority Data
Dec. 16, 2016 (DE) ............ 10 2016 225 352.2

(51) Int. Cl.
*B60W 40/068* (2012.01)
*B60W 10/20* (2006.01)
*B60W 10/22* (2006.01)

(52) U.S. Cl.
CPC ......... *B60W 40/068* (2013.01); *B60W 10/20* (2013.01); *B60W 10/22* (2013.01);
(Continued)

(58) Field of Classification Search
CPC .................................................. B60W 40/068
See application file for complete search history.

(56) References Cited

U.S. PATENT DOCUMENTS 7,203,579 B2 * 4/2007 Yokota ............... B60C 23/0477
303/150
8,914,213 B2 * 12/2014 Chimner ............ B60W 30/02
701/73
(Continued)

FOREIGN PATENT DOCUMENTS

CN      1608012 A      4/2005
CN    103228508 A      7/2013
(Continued)

OTHER PUBLICATIONS

Office Action for Chinese Patent Application No. 201780077681.3; dated Nov. 27, 2020.
(Continued)

*Primary Examiner* — Peter D Nolan
*Assistant Examiner* — Mikko Okechukwu Obioha
(74) *Attorney, Agent, or Firm* — Barnes & Thornburg LLP

(57) ABSTRACT

A method for estimating a friction coefficient of a roadway by a transportation vehicle, wherein a control device of the transportation vehicle receives a first estimated value of a maximum horizontal force from a traction control system that is transmitted to the roadway by a wheel of the transportation vehicle. A control device receives a second estimated value of a wheel contact-patch force of the wheel from a damper controller and calculates the friction coefficient as a vehicle-independent friction coefficient based on the estimated values from the wheel contact-patch force and the horizontal force.

18 Claims, 1 Drawing Sheet

(52) U.S. Cl.
CPC ..... *B60W 2420/42* (2013.01); *B60W 2552/40* (2020.02); *B60W 2720/26* (2013.01)

(56) References Cited

U.S. PATENT DOCUMENTS

| | | | | |
|---|---|---|---|---|
| 9,045,117 | B2* | 6/2015 | Wakao | ................. B60W 40/06 |
| 9,643,617 | B2* | 5/2017 | Fischer | ................. B60T 8/1725 |
| 10,943,498 | B1* | 3/2021 | Loiacono | ................. G09B 7/02 |
| 2012/0029783 | A1* | 2/2012 | Takenaka | ................. B60T 8/172 |
| | | | | 701/73 |
| 2013/0253795 | A1 | 9/2013 | Brueggemann et al. | |
| 2015/0166072 | A1 | 6/2015 | Powers et al. | |
| 2015/0251658 | A1* | 9/2015 | Kato | ................. B60T 8/172 |
| | | | | 701/22 |
| 2019/0210606 | A1* | 7/2019 | Hagenlocher | ....... B60W 40/068 |
| 2020/0262434 | A1* | 8/2020 | Watanabe | ............... B60T 7/122 |
| 2020/0380862 | A1* | 12/2020 | Kakehi | ............. B60W 40/068 |
| 2020/0406898 | A1* | 12/2020 | Mitsugi | ........... B60W 30/18172 |

FOREIGN PATENT DOCUMENTS

| | | |
|---|---|---|
| DE | 19730414 A1 | 1/1999 |
| DE | 19855332 A1 | 6/2000 |
| DE | 10017506 A1 | 1/2002 |
| DE | 10107455 A1 | 1/2002 |
| DE | 102004008265 A1 | 9/2005 |
| DE | 102009041566 A1 | 3/2011 |
| DE | 102012101085 A1 | 8/2013 |
| DE | 102012220312 A1 | 5/2014 |
| DE | 102012112724 A1 | 6/2014 |
| DE | 102012112725 A1 | 6/2014 |
| DE | 102013211027 A1 | 12/2014 |
| DE | 102014225085 A1 | 6/2016 |
| EP | 1197408 A2 | 4/2002 |
| JP | 2016119738 A | 6/2016 |
| WO | 2011054363 A1 | 5/2011 |
| WO | 2015074744 A1 | 5/2015 |

OTHER PUBLICATIONS

Search Report for International Patent Application No. PCT/EP2017/080822; dated Feb. 14, 2018.

* cited by examiner

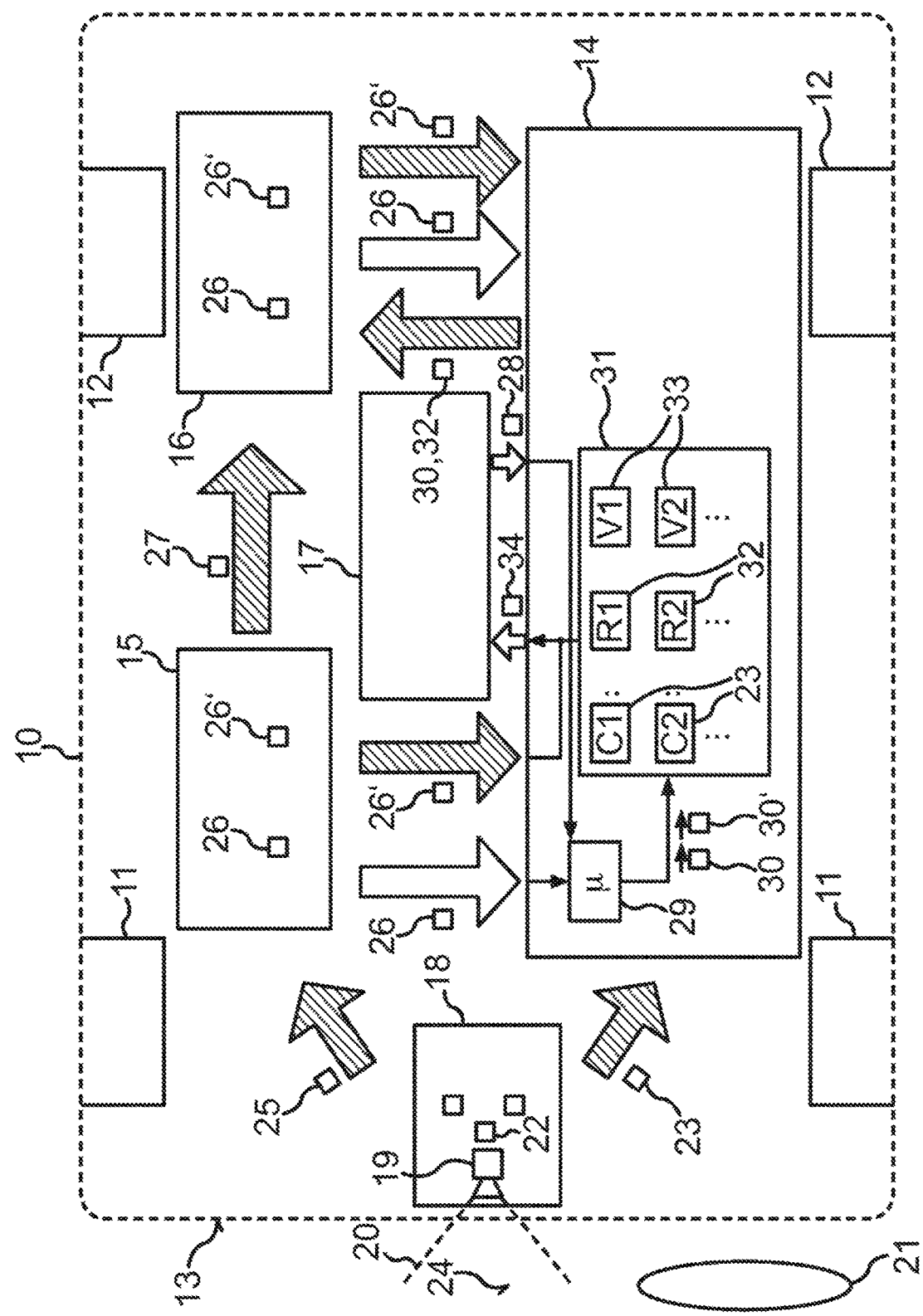

METHOD FOR ESTIMATING A FRICTION COEFFICIENT OF A ROADWAY BY A TRANSPORTATION VEHICLE, CONTROL DEVICE, AND TRANSPORTATION VEHICLE

PRIORITY CLAIM

This patent application is a U.S. National Phase of International Patent Application No. PCT/EP2017/080822, filed 29 Nov. 2017, which claims priority to German Patent Application No. 10 2016 225 352.2, filed 16 Dec. 2016, the disclosures of which are incorporated herein by reference in their entireties.

SUMMARY

Illustrative embodiments relate to a method for estimating a coefficient of friction of a roadway by a transportation vehicle or from a transportation vehicle. The method is carried out by a control device which is also disclosed. Lastly, illustrative embodiments relate to a transportation vehicle comprising the disclosed control device.

BRIEF DESCRIPTION OF THE DRAWINGS

An exemplary embodiment is described in the following with reference to the drawing, in which:

FIG. 1 is a schematic view of an embodiment of the transportation vehicle.

DETAILED DESCRIPTION

The estimation of a coefficient of friction of a roadway is described in DE 10 2009 041 566 A1. This document shows that the knowledge or an estimation of the coefficient of friction is useful for operating a driving dynamics control system, for example, a slip control system (ESC—electronic stability control). According to the document, coefficient of friction information is also determined based on maps and position data.

Furthermore, it is known to categorize estimates of coefficients of friction into classes. In the case where a driver's manner of driving means that tires of the transportation vehicle are operated on the limit of adhesion, that is to say are just short of slipping, a coefficient of friction can be estimated by a slip control system itself. Using a slip control system to estimate the coefficient of friction has the drawback that, within the slip control system, only the maximum transmittable horizontal force of a wheel can actually be estimated, and the vertical force required to calculate the coefficient of friction is estimated by assuming, for example, that the transportation vehicle mass is uniformly distributed across all four wheels of the transportation vehicle. This leads to an imprecise estimation of the coefficient of friction. Another downside of estimating the coefficient of friction from the slip control lies in the fact that the coefficient of friction can be determined only a posteriori, that is to say when the transportation vehicle has already driven over the respective point on the roadway.

DE 10 2013 211 027 A1 discloses detecting a quality of a roadway surface which reduces the coefficient of friction, such as a covering of snow or accumulations of mud, by a camera. Camera-based methods have the drawback that they provide only some valid values, since the estimation based on a camera system is very imprecise. However, the estimation is available in good time.

The disclosed embodiments address the problem of providing an estimation of a coefficient of friction of a roadway in a transportation vehicle.

The disclosed embodiments provide the method for estimating a coefficient of friction of a roadway, which can be carried out "on-board", that is to say by a control device of a transportation vehicle. As already described in connection with the prior art, the control device receives an estimate of a maximum horizontal force, which can be transmitted by a wheel of the transportation vehicle to the roadway, from a slip control system, for example, an ESC. This estimate is referred to here as the first estimate, since a second estimate is introduced in the following. The maximum transmittable horizontal force is also referred to as a horizontal force potential.

As already explained, by the maximum transmittable horizontal force, a coefficient of friction can also be estimated by the slip control system. However, this estimated coefficient of friction is based on the fact that the vertical force is based on a rough estimation relating to the transportation vehicle mass being distributed across the four wheels of the transportation vehicle.

To avoid this rough estimation, it is provided that the control device receives the second estimate from a damping control of the transportation vehicle, which estimate indicates the wheel contact force of the wheel. The wheel contact force is the force which acts between the tire of the wheel and the surface of the roadway. The force is thus the current or actually acting vertical force which is not based on an estimation. Since the control device, that is to say the slip control system, is combined with or linked to the damping control, an estimate can be used for the horizontal force and an estimate can be used for the vertical force or wheel contact force which are not based on a rough, situation-independent assumption, but rather take into account the current driving situation. The control device then calculates the coefficient of friction based on these two estimates, that is to say from the wheel contact force and the horizontal force. This coefficient of friction is also valid irrespective of the transportation vehicle, that is to say it can also be used for other transportation vehicles (referred to as third-party transportation vehicles) having a different transportation vehicle mass and/or different tires, to allow, for example, a prediction of the maximum available horizontal force.

Damping control can determine the estimate of the wheel contact force, for example, as follows. Firstly, it is possible to take into account what force from the transportation vehicle body of the transportation vehicle, that is to say the spring-mounted part of the transportation vehicle, acts on the wheel. This force is transmitted via the damper or the suspension strut from the transportation vehicle body to the wheel. In this case, a spring tension of a spring of the damper is acting. The spring tension can be determined according to the compression travel or damper travel of the damper. A damping force is also acting, which can be determined based on the damper rigidity according to a change over time in the compression travel. Another force input of the transportation vehicle body can be transmitted to the wheel by a roll stabilizer. From the spring tension, the damper force and the roll-stabilizer force, the total force acting on the wheel from the transportation vehicle body can thus be determined, which is referred to here as the transportation vehicle contact force on the wheel. By contrast, an acceleration force can act when the wheel is raised or accelerated during a journey, for example, by a bump, or falls into a pothole. For this purpose, the change over time in the compression travel can also be determined. In this case, to distinguish between a movement of the wheel itself and a movement of the transportation vehicle body, a signal of an acceleration sensor of the transportation vehicle body can be used. A movement of the wheel itself can be detected here if, for example, the transportation vehicle body remains unaccelerated. The acceleration of the wheel results from the change over time in the movement speed of the wheel, and the acceleration force acting on the wheel can then be determined based on an indication of the wheel mass. Then only the wheel contact force of the wheel on the roadway is missing. The sum of all the mentioned forces must then add up to zero (equilibrium of forces), and therefore the missing variable, namely the wheel contact force, can be calculated from this system of equations.

The damping control can thus provide an estimation of the wheel contact force which can be used together with the horizontal force provided from the slip control system to calculate the vehicle-independent coefficient of friction.

The disclosed embodiments also include optional additional technical features which provide further benefits.

Based on the measuring method described, another benefit can be achieved in that the method also detects if the wheel has absolutely no adhesion or only a small amount of adhesion on the road, for example, because the wheel is currently driving over a pothole and therefore is, for example, temporarily floating in the air, that is to say has no adhesion at all. For this purpose, it is provided that the coefficient of friction which has been estimated or calculated is discarded, or the calculation of the coefficient of friction is even completely omitted, if the estimate of the wheel contact force (second estimate) is smaller than a predetermined minimum value. If the wheel contact force is thus so low that it indicates a wheel which is not completely resting or supported on the roadway, that is to say is smaller than the predetermined minimum value, it is assumed that the coefficient of friction is also to be discarded or is not to be calculated because it does not represent the frictional properties of the roadway.

The control device can also be configured to learn. For this purpose, it can be provided that the control device receives class information about a surface class of a driving surface of the roadway from an environment detection method or mechanism. With regard to surface class, the environment detection method or mechanism can distinguish, for example, between a "bitumen coating" and a "sandy track" and "gravel" and "cobblestones", to name just a few examples. The class information then indicates the currently detected driving surface. Furthermore, the control device can store the calculated coefficient of friction in a memory separately according to surface class as a statistical coefficient of friction. The coefficient of friction is therefore statistical because it is continuously recursively updated in that, when driving over an additional roadway for which the environment detection method or mechanism signals the same surface class, a coefficient of friction is estimated again, and the statistical coefficient of friction already stored in the memory is recursively updated with this new coefficient of friction. For this purpose, for example, a recursive averaging or an averaging calculation can be provided. For each surface class, the statistical coefficient of friction is thus separately recursively improved or specified or defined more precisely. As already explained, this statistical link can be performed or carried out as an average, a moving average or recursive smoothing, to name just a few examples. By the storage separated by surface classes, in this case the coefficients of friction of different driving surfaces, for example, a sandy track on the one hand and bitumen on the other hand, are prevented from overlapping or mixing or influencing one another.

To produce the class information, that is to say to detect the surface class, it can be provided that the environment detection method or mechanism has an image-processing unit which detects, for example, the driving surface ahead by a camera. The image-processing unit thus optically captures the driving surface and classifies it. For example, the classification can take place based on a pattern comparison with known image patterns or textures and/or colors of driving surfaces from different surface classes. For this purpose, for example, a Hidden Markov Model (HMM) and/or an artificial neuronal network can be used for the image analysis of the camera images.

At least one benefit of storing a statistical coefficient of friction also consists in the fact that a prediction of the coefficient of friction can now also be provided, for example, for a front wheel of the transportation vehicle, that is to say that a region of the roadway does not have to be driven over first to calculate a coefficient of friction a posteriori. For this purpose, based on the coefficient of friction and the wheel contact force stored in the memory, as provided by the damping control as a second estimate, a value of a maximum available horizontal force, that is to say a value of the potential of the horizontal force, can be calculated, and the value can be provided to the slip control system as a prediction. Thus, before driving over a specific region of the roadway, with regard to the region, the slip control system receives a value of the maximum available horizontal force and can likewise provide the then determined value of the maximum available horizontal force in the already described manner a posteriori.

The described statistical coefficient of friction in the memory does not necessarily converge to a reliable, correct coefficient of friction. To evaluate this, it may be provided that, in the memory, in each surface class, a confidence level is also provided for the coefficient of friction thereof. This confidence level indicates a distribution of the coefficients of friction taken into account in the statistical coefficient of friction and/or a measure of confidence of the class estimate of the surface class of the individual coefficients of friction. The distribution can be indicated, for example, as a statistical variance. The measure of confidence of the class estimate can be determined, for example, from the classifier, that is to say, for example, the HMM or artificial neuronal network, in a manner known per se. The statistical coefficient of friction from the memory is then provided together with the confidence level thereof so that a device or system using the coefficient of friction, for example, the slip control system, detects, based on the confidence level, how reliable the statistical coefficient of friction has been estimated to be. The statistical coefficient of friction, together with the confidence level thereof, can also be provided to a receiver outside the transportation vehicle, for example, to a third-party transportation vehicle and/or a stationary database, for example, on the internet. From a database, for example, on the internet, additional third-party transportation vehicles can then read or retrieve the coefficient of friction of each surface class. As a result, these receivers outside the transportation vehicle can also adapt the transportation vehicle properties thereof, which can be carried out with less convergence time, since the statistical coefficients of friction are provided so as to be separated according to surface class.

A roadway of a given surface class, for example, "bitumen", can still have different coefficients of friction as a result of current environmental conditions, for example, in the case of different temperatures and/or moisture levels. Therefore, it may be provided that the stored statistical coefficient of friction is adapted to a current climatic condition signaled by at least one sensor signal before being used by another device or system. The climatic condition can be, for example, the ambient temperature and/or weather information, for example, "rain" or an amount of precipitation. It is also possible to take into account how long ago the last rainfall was, and that a first rainfall is now detected after this dry period. As a result, it is possible to deduce the presence of a film of lubricant after a rain break and then rain setting in, and the statistical coefficient of friction can be corrected accordingly.

During a journey, a prediction can also be provided inside the transportation vehicle, that is to say an estimation of the coefficient of friction, before a wheel reaches the corresponding point or the corresponding region of the driving surface. For this purpose, it can be provided that the coefficient of friction on a front wheel of the transportation vehicle is determined and is transmitted as a predicted coefficient of friction to a control device for a rear wheel of the transportation vehicle. Thus, at least on the rear wheel, the control device can obtain a predicted coefficient of friction in advance. For the prediction of the coefficient of friction on the rear wheel, the coefficient of friction can be transmitted, for example, to a damping control. Using the wheel contact forces of the damping control, the horizontal force potential can then be predicted.

This can be used, for example, in that, in a surface region of the roadway over the front wheel, a coefficient of friction is detected as being smaller than a predetermined minimum value, that is to say that it is detected that it is smooth, and a steering-wheel control is controlled by a steering signal which is designed to drive around this surface region with the (following) rear wheel or drive through the region, taking into account the coefficient of friction. This can be used, for example, during a braking maneuver to decrease the braking distance. Generally, a critical surface region (coefficient of friction smaller than the minimum value) is thus driven around with the rear wheel. Based on the prediction, for example, rear axle steering can be pre-controlled to keep a course of the transportation vehicle constant. A new trajectory for driving round a region can be selected based on camera data. Only this data ensures that the anomaly is not present in the alternate path. By taking into account the coefficient of friction, in particular, a device for selecting the driving direction (e.g., rear axle steering) is controlled to compensate for a track deviation in the case of a coefficient of friction anomaly by a wheel position.

To be able to carry out the disclosed method in a transportation vehicle, a control device for a transportation vehicle is provided by the disclosed embodiments. The control device can be, for example, a control unit. The control device comprises a processor method or mechanism which is designed to carry out an exemplary embodiment of the disclosed method. For this purpose, the processor method or mechanism can have a microprocessor or microcontroller. The method can be implemented based on a program code for the processor method or mechanism.

In the exemplary embodiment, the components described each represent individual features of the disclosure which are to be considered independently of one another, which each also develop the disclosure independently of one another and thus are also to be considered part of the disclosure individually or in combinations other than the combination shown. Furthermore, the embodiment described can also be supplemented by additional features of the disclosure which have already been described.

The drawing shows a transportation vehicle 10, which is, for example, a transportation vehicle, in particular, a car or heavy goods vehicle. The drawing shows front wheels 11, rear wheels 12, a transportation vehicle front 13, a control device 14, a damping control 15 for a front axle having the front wheels 11, a damping control 16 for a rear axle having the rear wheels 12, a slip control 17 and an environment detection method or mechanism 18 having a camera 19, the detection region 20 of which is oriented towards the transportation vehicle front 13.

In the drawing, arrows illustrate a transmission of data or values between the described components. The cross-hatched arrows indicate projection information which is already available when a respective surface region 21 of the roadway has not yet been driven over, that is to say that the projection information is available before the corresponding roadway region 21 is driven over. The arrows without cross-hatching represent information for identification, as available, after the roadway region 21 has been driven over and the current driving-over process has been taken into account.

The environment detection method or mechanism 18 can determine a surface class 23 of a driving surface of the roadway 24 ahead based on an image-processing unit 22 by the camera 19 and provide the surface class to the control device 14. Optionally, based on camera images, an elevation profile 25 can also be determined and provided to the damping control 15. An elevation profile can be provided, for example, in the manner as known from DE 10 2013 211 027 A1, which is cited at the outset.

The damping control 15 can determine a wheel contact force 26 for a respective front wheel 11 and optionally predict or project a predicted wheel contact force 26' from the elevation profile 25. This can take place in a model-based, known manner. From a relative movement of the front wheel 11 with respect to the vehicle body of the transportation vehicle 10, a road profile 27 can optionally be determined and provided to the damping control 16. In turn, the damping control 16 can determine a current wheel contact force 26 and a predicted wheel contact force 26', for example, in a model-based, predictive manner.

The slip control 17 can determine a current maximum horizontal force 28 in a manner known per se based on a detection of a slip of a wheel 11, 12.

Based on the current maximum horizontal force 28 and the current wheel contact force 26, the control device 14 can determine the current coefficient of friction of the roadway 24 located under the wheel 11 by a coefficient of friction estimation 29. The coefficient of friction 30 thus estimated can be combined in a memory 31 under the current surface class 23 indicated in each case (for example, class information C1, C2 can be provided) with a statistical coefficient of friction 32 stored in the memory 31 to provide an updated statistical coefficient of friction 32. A confidence level 33 can additionally be indicated, which can be dependent on a variance in the coefficients of friction 30 which are taken into account in the respective statistical coefficient of friction 32. The respective statistical coefficient of friction 32 can also be read from the memory 31 based on the determined surface class 23 and, for example, provided to the slip control 17 as a prediction. Instead of the coefficient of friction 32, by combination with the predicted wheel contact force 26', a predicted maximum horizontal force 34 can also be provided to the slip control 17 as a prediction. By the prediction, in the slip control 17, for example, the plausibility of a currently detected maximum value of the horizontal force 28 can be checked.

The coefficient of friction 30 or the statistical coefficient of friction 32 can also be provided to the damping control 16 for the rear axle so that the control can predictively set or prepare damping control for dampers of the rear wheels 12.

The current wheel contact force 26 and/or the predicted wheel contact force 26' of the rear wheels 12 determined by the damping control 16 can be used to verify the statistical coefficients of friction 32 likewise by calculating corresponding rear-axle coefficients of friction 30'.

The described calculation methods allow multiple control options in the transportation vehicle 10. This results, for example, in the following input variables for the coefficient of friction estimation:

The camera captures the roadway as an optical sensor. The surface is classified based on the visual impression of the roadway. This takes place before the drive-over. This classification of the surface is sent to the coefficient of friction estimator. Subsequently, in the estimator, an individual coefficient of friction is learned for each surface class.

By the camera, in particular, a sudden change in the surface can be registered. (E.g., dry/wet; asphalt/cobbles; sand, leaves). In this case, the camera provides information so that the transportation vehicle can quickly adjust to a new coefficient of friction or omit a short-term variation when calculating the coefficient of friction.

If triggered by the sensors, the roadway profile is optionally determined. The roadway profile is then used for the damping control to estimate the future wheel contact forces.

The slip control system (e.g., ESC/ESP, ESP—electronic stability program) can be capable of determining a maximum horizontal force and thus the coefficient of friction from the wheel slip and the transmitted forces. However, since the wheel contact force is normally not known, an average wheel contact force is generally assumed in the calculation. If the coefficient of friction is known, driving maneuvers can be adjusted based on the maximum transmittable horizontal force. First and foremost, this relates to limiting the drives and torques of the individual wheels. However, an identified coefficient of friction applies only to the roadway which has already been driven over. The validity for the future is debatable due to possible changes in the surface or variations in the wheel contact forces.

In the transportation vehicle 10, the change now emerges that the identified coefficient of friction or the identified maximum horizontal force (horizontal force potential) is to be transmitted only as a raw value to a superordinate coefficient of friction estimator as the coefficient of friction estimation 29. After a fusion with camera data and a wheel contact force estimation, the coefficient of friction estimator provides an estimate for the coefficient of friction. The estimate is then used for the slip control.

A wheel contact force is estimated by the sensors of the damping control (DCC—dynamic chassis control). This information is available after a slight delay, since a filtration and a calculation must take place first. The information can be used in the slip control to estimate coefficient of friction.

If predictive information about the road profile to be driven over is available for an axle, then the vertical dynamics can be calculated in a model, and the wheel contact force can be predictively output. In this case, the predictive information can be transmitted to the rear axle by additional preview sensors or by a prediction, e.g., of the front axle movement.

The coefficient of friction estimator (coefficient of friction estimation 29) can proceed as follows for the individual wheels. The slip control system provides the identified coefficient of friction or the maximum horizontal force as a raw value for the coefficient of friction calculation. The damping control provides the current wheel contact force. The camera provides current and future surface classes.

Coefficients of friction for individual wheels are learned by calculating the final coefficient of friction from the raw value and the wheel contact force. The final coefficient of friction is then allocated to the respective surface class. According to the surface class, the new coefficients of friction for the surface classes in question are then learned. The confidence intervals for the learned surface classes can be determined based on the deviation of the coefficients of friction from previously learned coefficients of friction and the previous confidence interval. A reduction in the confidence intervals for all unlearned measurement values due to the values being insufficiently up-to-date (outdated values) can also be provided.

Coefficients of friction and confidence intervals for a surface which will be driven over in the future are estimated based on the surface class identified by the camera. A horizontal force potential is then determined using the wheel contact force. If the wheel contact force is not available from models of the damping control, then the wheel contact force is estimated from the longitudinal and transverse dynamics, or a fixed value is assumed. The horizontal force potential (alternatively the coefficient of friction) and the confidence interval can be transmitted to the slip control.

Coefficients of friction can be stored by surface class in the navigation memory with critical points identified. Possible storage information can be:

Road XYZ from A to B is 90% asphalt and 10% concrete. The asphalt has a coefficient of friction of 0.9 when dry at 20°, and 0.5 when wet. Anomaly at km 2.5-2.65 coefficient of friction on asphalt, below 0.3 when wet.

Communication of the coefficients of friction via surface classes is possible with C2X (Car to X). The coefficients of friction in the C2X can also be corrected by transportation vehicle properties (e.g.: transportation vehicle A 10% less, transportation vehicle B 10% more).

The automatic adaptation of the coefficients of friction and confidence intervals for individual route portions to climatic conditions (e.g., rain, temperature) can also be provided.

It is also possible to display locally low coefficients of friction (smaller than a threshold value) for the driver (from C2X or the navigation memory).

When there is only a small deviation in trajectory, an automatic full brake application can bypass low coefficients of friction or drive through, for example, a sandy track taking the coefficient of friction into consideration.

It is thus possible to estimate the coefficient of friction taking into account the wheel contact force. It is also possible to extrapolate future estimated coefficients of friction from the coefficient of friction history taking into account the camera image. It is also beneficial to determine a horizontal force potential from the estimated coefficient of friction and the determined wheel contact force. Steering, drive and/or braking method or mechanism on the transportation vehicle can now be controlled taking into account the limited horizontal force (horizontal force potential). A back measurement of the ensuing actual wheel slip and/or slip angle can be used to check the actual effectiveness of the estimation.

The clustering of the driving surface according to the optical camera image and the learning based thereon of the coefficient of friction and the reliability of the coefficient of friction takes place separately for different subgroups.

As developments, it can also be provided that the exchange of the determined coefficients of friction relating to the surface takes place with the environment C2X, WLAN or mobile communications. These transmitted values can then be corrected by the respective transportation vehicle properties in a receiving transportation vehicle. This can also take place precisely by classifying via the surface. It is also possible to correct the coefficients of friction in the event of a change in the environmental conditions based on the change (primarily ambient temperature, sunlight, moisture).

For the rear axle, when driving straight ahead, it is possible to also use the coefficient of friction identified on the front axle directly on the rear axle. This may be carried out in the event of full brake application within the same lane.

Merely the information that there were vertical excitations from the roadway (elevation profile) frequently suggests that there was an anomaly when determining the coefficient of friction (for example, the wheel being raised). This vertical excitation from the roadway can be detected, and in such a case, the determined coefficient of friction is no longer used for the coefficient of friction estimation, but rather is, for example, discarded.

Overall, the example shows how the disclosed embodiments can provide a method for estimating a coefficient of friction based on a visual classification of the surface.

LIST OF REFERENCE SIGNS 10 transportation vehicle
11 front wheel
12 rear wheel
13 transportation vehicle front
14 control device
15 damping control
16 damping control
17 slip control system
18 environment detection method or mechanism
19 camera
20 detection region
21 driving surface region
22 image-processing method or mechanism
23 surface class
24 roadway
25 elevation profile
26 wheel contact force
26' wheel contact force
27 road profile
28 horizontal force
29 coefficient of friction estimation
30 coefficient of friction
30' coefficient of friction
31 memory
32 statistical coefficient of friction
33 confidence level
34 horizontal force potential

The invention claimed is:

1. A method for estimating a coefficient of friction of a roadway by a transportation vehicle, the method comprising:
receiving, by a control device of the transportation vehicle, a first estimate of a maximum horizontal force transmitted by a wheel of the transportation vehicle to the roadway from a slip control system of the transportation vehicle;
receiving, by the control device, a second estimate of a wheel contact force of the wheel from a damping control of the transportation vehicle, the damping control including a suspension strut of the wheel, a damper having a spring, and a roll-stabilizer of the vehicle, wherein the second estimate of the wheel contact force is determined based on at least one of a spring tension force of the spring of the damper acting on the wheel in response to the transportation vehicle transmitting a force to the wheel, a damping force based on a damper rigidity of the damper in response to the transportation vehicle transmitting the force to the wheel, and a roll-stabilizer force transmitted to the wheel via the roll-stabilizer; and
calculating a vehicle-independent coefficient of friction, by the control device, based on the estimates of the wheel contact force and the horizontal force.

2. The method of claim 1, wherein, in response to a fluctuation in wheel load being greater than a predetermined maximum value, the coefficient of friction is discarded or the calculation of the coefficient of friction is omitted.

3. The method of claim 1, wherein the control device receives class information of a surface class of a driving surface of the roadway from an environment detection sensor and stores the calculated coefficient of friction in a memory under the surface class as a statistical coefficient of friction, and calculates a coefficient of friction again when driving over another roadway for which the environment detection sensor signals the same surface class and recursively updates the statistical coefficient of friction in the memory with the coefficient of friction.

4. The method of claim 3, wherein the control device receives the class information from an image-processing unit of the environment detection sensor, which unit optically captures and classifies the driving surface.

5. The method of claim 3, wherein a value of the maximum available horizontal force is projected based on the coefficient of friction stored in the memory and the wheel contact force, and the value is provided to the slip control system as a prediction.

6. The method of claim 3, wherein a confidence level is provided in the memory for each surface class for the statistical coefficient of friction thereof, and the confidence level indicates a distribution of the coefficients of friction taken into account in the statistical coefficient of friction and/or a measure of confidence of the class estimate of the surface class, and the statistical coefficient of friction is provided together with the confidence level thereof.

7. The method of claim 3, wherein the stored statistical coefficient of friction is adapted to a current climatic condition signaled by at least one sensor signal before being provided.

8. The method of claim 1, wherein the coefficient of friction is determined on a front wheel of the motor transportation vehicle and is transmitted as a predicted coefficient of friction to a control device for a rear wheel of the transportation vehicle.

9. The method of claim 8, wherein a coefficient of friction in a surface region of the roadway over the front wheel is detected as being smaller than a predetermined minimum value, and a steering-wheel control is controlled by a steering signal which drives around the surface region with the rear wheel or drives through the region with a predetermined wheel position taking into account the coefficient of friction.

10. A control device for a transportation vehicle, the control device comprising a processor implemented control device that estimates a coefficient of friction of a roadway by a transportation vehicle, wherein the control device of the transportation vehicle:

receives a first estimate of a maximum horizontal force which is transmitted by a wheel of the transportation vehicle to the roadway from a slip control system;

receives a second estimate of a wheel contact force of the wheel from a damping control of the transportation vehicle, the damping control including a suspension strut of the wheel, a damper having a spring, and a roll-stabilizer of the vehicle, wherein the second estimate of the wheel contact force is determined based on at least one of a spring tension force of the spring of the damper acting on the wheel in response to the transportation vehicle transmitting a force to the wheel, a damping force based on a damper rigidity of the damper in response to the transportation vehicle transmitting the force to the wheel, and a roll-stabilizer force transmitted to the wheel via the roll-stabilizer; and calculates a vehicle-independent coefficient of friction based on the estimates from the wheel contact force and the horizontal force.

11. The control device of claim 10, wherein, in response to a fluctuation in wheel load being greater than a predetermined maximum value, the coefficient of friction is discarded or the calculation of the coefficient of friction is omitted.

12. The control device of claim 10, wherein the control device receives class information of a surface class of a driving surface of the roadway from an environment detection sensor and stores the calculated coefficient of friction in a memory under the surface class as a statistical coefficient of friction, and calculates a coefficient of friction again when driving over another roadway for which the environment detection sensor signals the same surface class, and recursively updates the statistical coefficient of friction in the memory with the coefficient of friction.

13. The control device of claim 12, wherein the control device receives the class information from an image-processing unit of the environment detection sensor, which unit optically captures and classifies the driving surface.

14. The control device of claim 12, wherein a value of the maximum available horizontal force is projected based on the coefficient of friction stored in the memory and the wheel contact force, and the value is provided to the slip control system as a prediction.

15. The control device of claim 12, wherein a confidence level is provided in the memory for each surface class for the statistical coefficient of friction thereof, and the confidence level indicates a distribution of the coefficients of friction taken into account in the statistical coefficient of friction and/or a measure of confidence of the class estimate of the surface class, and the statistical coefficient of friction is provided together with the confidence level thereof.

16. The control device of claim 12, wherein the stored statistical coefficient of friction is adapted to a current climatic condition signaled by at least one sensor signal before being provided.

17. The control device of claim 10, wherein the coefficient of friction is determined on a front wheel of the transportation vehicle and is transmitted as a predicted coefficient of friction to a control device for a rear wheel of the transportation vehicle.

18. The control device of claim 17, wherein a coefficient of friction in a surface region of the roadway over the front wheel is detected as being smaller than a predetermined minimum value, and a steering-wheel control is controlled by a steering signal which drives around the surface region with the rear wheel or drives through the region with a predetermined wheel position taking into account the coefficient of friction.

* * * * *